US012800994B2

(12) United States Patent
Moon et al.

(10) Patent No.: US 12,800,994 B2
(45) Date of Patent: Nov. 17, 2026

(54) CAMERA MODULE

(71) Applicant: LG INNOTEK CO., LTD., Seoul (KR)

(72) Inventors: Da Hin Moon, Seoul (KR); Jin Young Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 232 days.

(21) Appl. No.: 18/681,336

(22) PCT Filed: Aug. 1, 2022

(86) PCT No.: PCT/KR2022/011261
§ 371 (c)(1),
(2) Date: Feb. 5, 2024

(87) PCT Pub. No.: WO2023/014000
PCT Pub. Date: Feb. 9, 2023

(65) Prior Publication Data

US 2025/0334859 A1 Oct. 30, 2025

(30) Foreign Application Priority Data

Aug. 3, 2021 (KR) ........................ 10-2021-0102232

(51) Int. Cl.
*G03B 17/12* (2021.01)
*G03B 17/08* (2021.01)

(52) U.S. Cl.
CPC ............. *G03B 17/12* (2013.01); *G03B 17/08* (2013.01); *G03B 2217/002* (2013.01); *G03B 2217/007* (2013.01)

(58) Field of Classification Search
None
See application file for complete search history.

(56) References Cited

U.S. PATENT DOCUMENTS 4,104,649 A 8/1978 Tanaka et al.
9,766,473 B1 * 9/2017 Tamasanis ............... G01B 5/14
2014/0002676 A1 1/2014 Ning
(Continued)

FOREIGN PATENT DOCUMENTS

CN 112042177 A 12/2020
CN 112954145 A 6/2021
(Continued)

OTHER PUBLICATIONS

Supplementary European Search Report dated Jul. 4, 2025 in European Application No. 22853378.2.
(Continued)

*Primary Examiner* — Robert E. Tallman
(74) *Attorney, Agent, or Firm* — SALIWANCHIK, LLOYD & EISENSCHENK

(57) ABSTRACT

A camera module comprises: a first body including a barrel portion having a hole formed therein; a lens module which is disposed at least partially in the hole, and includes a barrel having a lens disposed therein and a flange portion protruding from the outer surface of the barrel to be disposed on the barrel portion; and a ground member having both ends coupled to the barrel portion and the flange portion, respectively.

16 Claims, 4 Drawing Sheets

(56) References Cited

U.S. PATENT DOCUMENTS

| | | | | |
|---|---|---|---|---|
| 2014/0184899 | A1* | 7/2014 | McKinley | G03B 5/00 348/373 |
| 2019/0052782 | A1 | 2/2019 | Sung et al. | |
| 2021/0029280 | A1* | 1/2021 | Kim | G03B 17/12 |
| 2022/0357487 | A1* | 11/2022 | Noh | G02B 7/08 |
| 2023/0350273 | A1* | 11/2023 | Noh | G03B 17/12 |

FOREIGN PATENT DOCUMENTS

| | | | |
|---|---|---|---|
| JP | 2008-153881 | A | 7/2008 |
| JP | 2010-41709 | A | 2/2010 |
| JP | 2011-35458 | A | 2/2011 |
| JP | 2014-6406 | A | 1/2014 |
| JP | 2019-117303 | A | 7/2019 |
| JP | 2019-537317 | A | 12/2019 |
| JP | 2021-60574 | A | 4/2021 |
| KR | 10-2008-0082845 | A | 9/2008 |
| KR | 10-2017-0084552 | A | 7/2017 |
| KR | 10-2018-0090451 | A | 8/2018 |
| KR | 10-2019-0118771 | A | 10/2019 |
| WO | 2015/072642 | A1 | 5/2015 |

OTHER PUBLICATIONS

International Search Report dated Nov. 7, 2022 in International Application No. PCT/KR2022/011261.

Office Action dated Apr. 14, 2026 in Japanese Application No. 2024-507011.

Office Action dated Aug. 6, 2026 in Korean Application No. 10-2021-0102232.

* cited by examiner

CAMERA MODULE

CROSS-REFERENCE TO RELATED APPLICATIONS

This application is the U.S. national stage application of International Patent Application No. PCT/KR2022/011261, filed Aug. 1, 2022, which claims the benefit under 35 U.S.C. § 119 of Korean Application No. 10-2021-0102232, filed Aug. 3, 2021, the disclosures of each of which are incorporated herein by reference in their entirety.

TECHNICAL FIELD

The teachings in accordance with exemplary and non-limiting embodiments of this invention relate generally to a camera module.

BACKGROUND ART

In recent years, subminiature camera modules have been developed, and subminiature camera modules are widely used in small electronic products such as smartphones, laptops, game consoles, etc.

With the popularity of automobiles, subminiature cameras are not only used in small electronic products, but also in vehicles. For example, the subminiature cameras are used as dash (black box) cameras for vehicle protection or objective data of traffic accidents, rear view cameras that allow the driver to monitor the blind spots at the rear of the vehicle through the screen to ensure safety when reversing, and perimeter detection cameras that can monitor the surroundings of the vehicle.

The camera may comprise a lens, a lens holder for receiving the lens, an image sensor for converting an image of a subject gathered by the lens into an electrical signal, and a printed circuit board on which the image sensor is mounted. The housing forming the exterior of the camera may have an enclosed structure throughout to inhibit contamination of the internal components with foreign matters, including moisture.

DETAILED DESCRIPTION OF INVENTION

Technical Subject

It is an object of the present invention to provide a camera module that can further improve the electrical characteristics of the camera module by improving its structure.

Technical Solution

A camera module according to an exemplary embodiment of the present invention may comprise:

- a first body including a barrel portion having a hole formed therein;
- a lens module which is disposed at least partially in the hole, and includes a barrel having a lens disposed therein and a flange portion protruding from the outer surface of the barrel to be disposed on the barrel portion; and
- a ground member having both ends coupled to the barrel portion and the flange portion, respectively.

Preferably, but not necessarily, the ground member may include a pogo pin.

Preferably, but not necessarily, the pogo pin may include a body coupled to the barrel portion, and a pin resiliently coupled to the body and coupled to the flange portion.

Preferably, but not necessarily, the ground member may include a spring.

Preferably, but not necessarily, an upper surface of the barrel portion or a lower surface of the flange portion to which the ground member is coupled may be provided with a recess shaped to be more recessed than other areas.

Preferably, but not necessarily, a sealing member may be disposed between the barrel portion and the flange portion, and the barrel portion and the flange portion may be spaced apart in an optical axis direction.

Preferably, but not necessarily, the first body and the lens module may be made of metal, and at least some of the surfaces of the first body and the lens module may have a coating region.

Preferably, but not necessarily, the surface of the barrel portion and the flange portion to which the ground member is coupled is a region other than the coating region, and a metal layer may be exposed therefrom.

Preferably, but not necessarily, a side of the flange portion may be disposed more inwardly than a side of the barrel portion, and the ground member may be disposed more inwardly than the sealing member.

A camera module according to another exemplary embodiment of the present invention may comprise: a first body;

- a lens module disposed on an inner side of the first body; and
- a pogo pin coupled to the first body and the lens module.

Advantageous Effect

Through these exemplary embodiments, the lens module and the first body are electrically connected to each other to form a ground region, so that external electromagnetic waves can be radiated to the outside without entering the components within the camera module, thereby further improving the electrical characteristics of the camera module and inhibiting the inclusion of noise in the electrical signal, thereby obtaining a superior quality image.

BEST MODE

Hereinafter, exemplary embodiments of the present invention will be described in detail with reference to the accompanying drawings.

However, the present invention is not limited to the given exemplary embodiments described, but may be implemented in a variety of different forms, and one or more of components among the exemplary embodiments may be optionally combined or substituted between embodiments within the scope of the present invention.

Furthermore, terms (including technical and scientific terms) used in the embodiments of the present invention, unless expressly specifically defined and described, are to be interpreted in the sense in which they would be understood by a person of ordinary skill in the art to which the present invention belongs, and commonly used terms, such as dictionary-defined terms, are to be interpreted in light of their contextual meaning in the relevant art.

Furthermore, the terms used in the embodiments of the invention are intended to describe the embodiments and are not intended to limit the invention.

In this specification, the singular may include the plural unless the context otherwise requires, and references to "at least one (or more) of A and (or) B and C" may include one or more of any combination of A, B, and C that may be assembled.

In addition, in explaining the components of exemplary embodiments of the present invention, the terms first, second, A, B, (a), (b), and the like may be used. Such terms are intended only to distinguish one component from another, and are not intended to limit the nature or sequence or order of such components by such terms.

Furthermore, when a component is described as "connected," "coupled," or "attached" to another component, it can include cases where the component is "connected," "coupled," or "attached" to the other component directly, as well as cases where the component is "connected," "coupled," or "attached" to another component that is between the component and the other component.

Furthermore, when described as being formed or disposed "above" or "below" each component, "above" or "below" includes not only when two components are in direct contact with each other, but also when one or more other components are formed or disposed between the two components. Furthermore, when expressed as "above" or "below", it may include the meaning of upward as well as downward with respect to a single component.

As used herein, "optical axis direction" is defined as the optical axis direction of the lens. On the other hand, "optical axis direction" may correspond to "up and down direction", "z-axis direction", etc.

Hereinafter, the present invention will be described in more detail with reference to the accompanying drawings.

Figure 1:
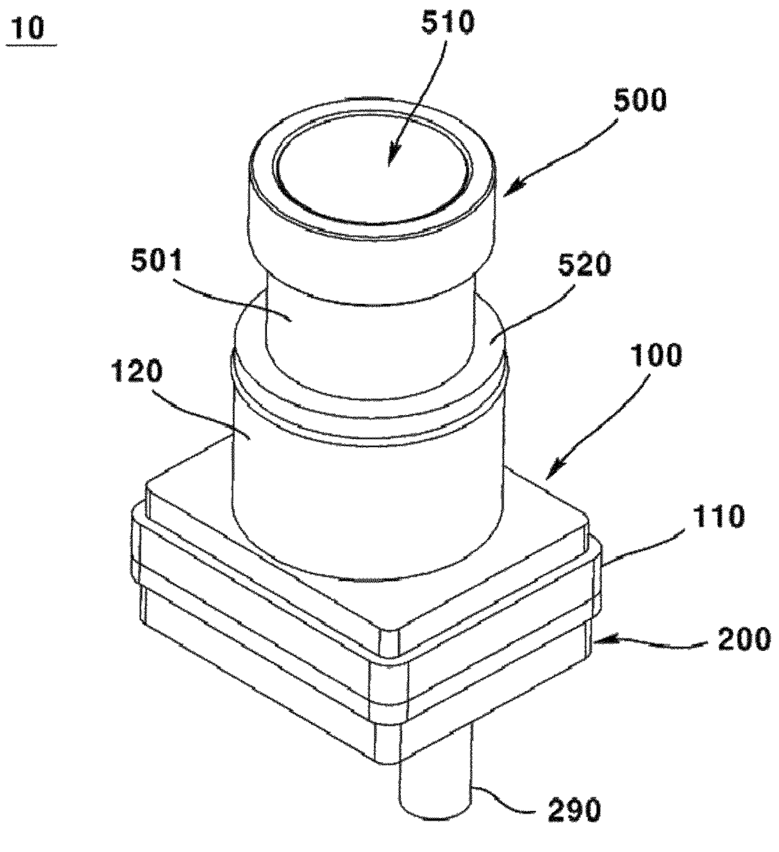
FIG. 1 is a perspective view illustrating the appearance of a camera module according to an exemplary embodiment of the present invention.
Figure 2:
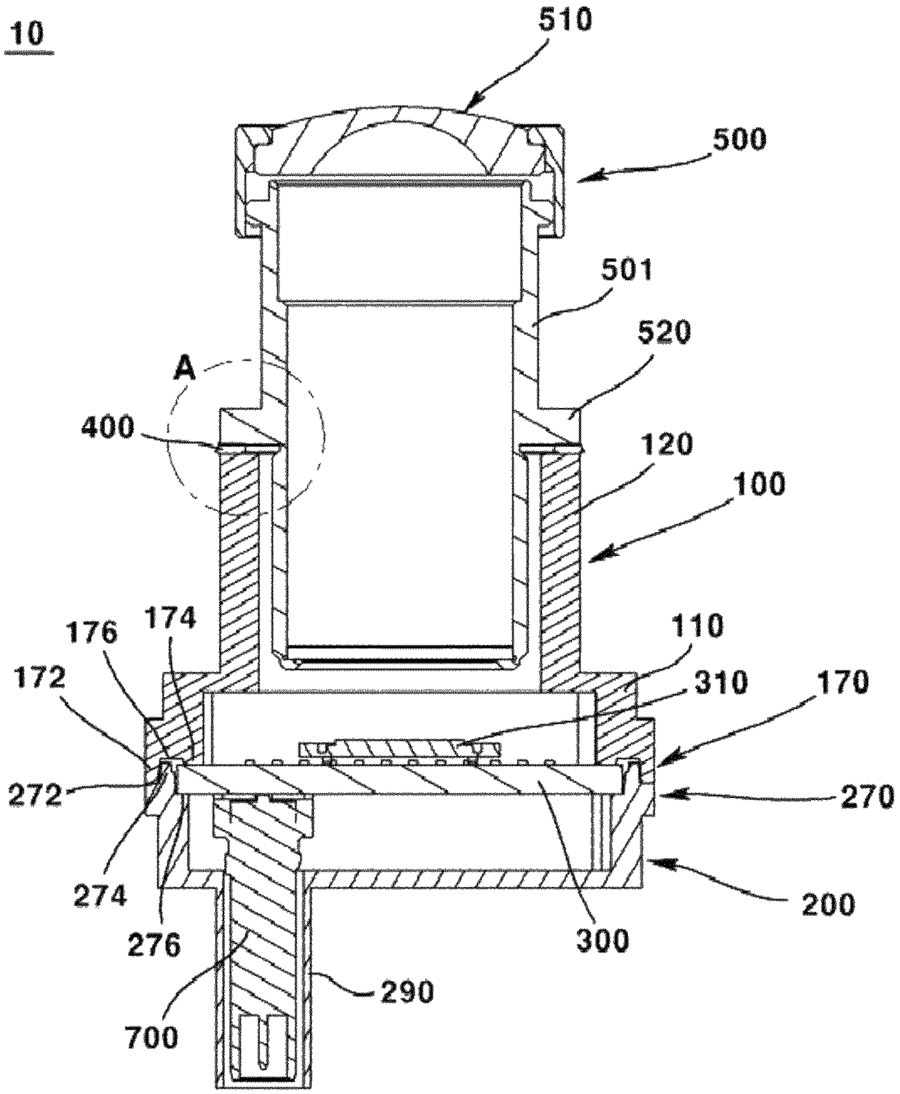
FIG. 2 is a cross-sectional view of a camera module according to an exemplary embodiment of the present invention.
Figure 3:
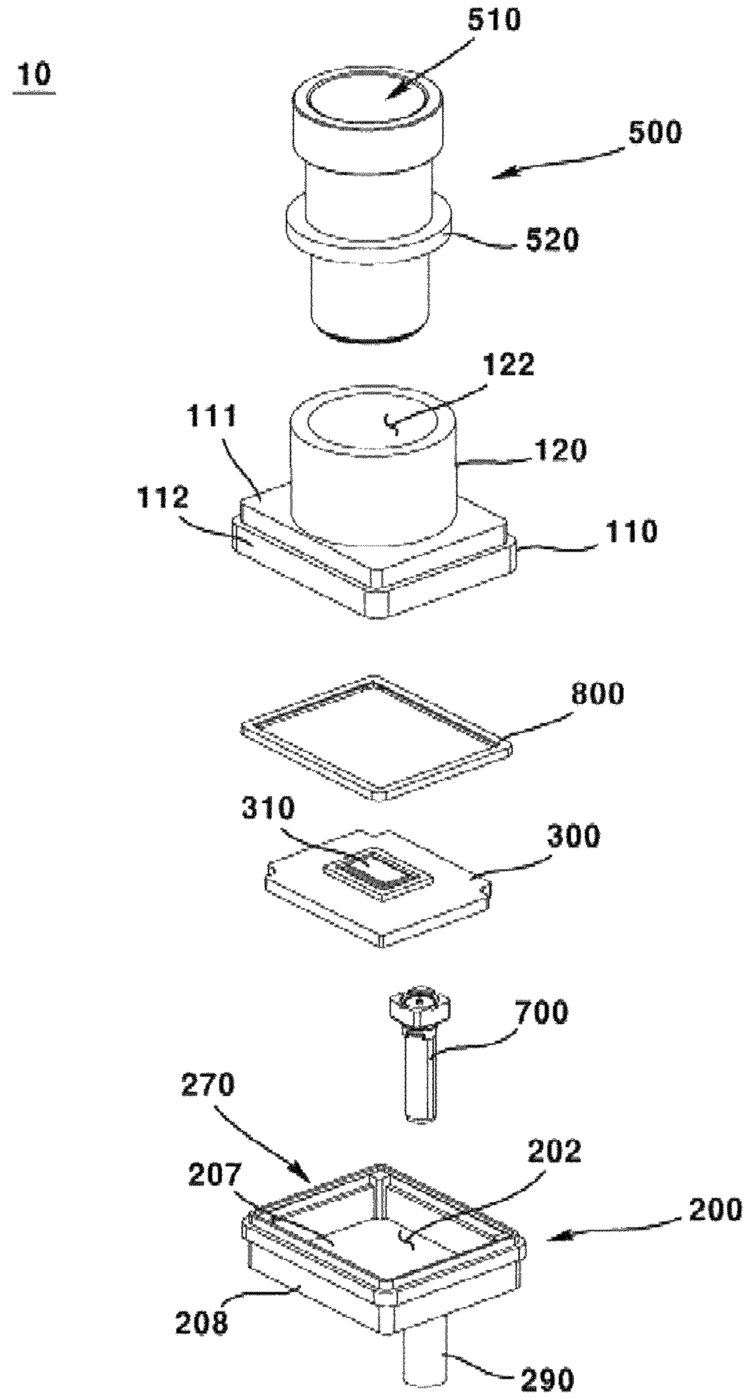
FIG. 3 is an exploded perspective view of a camera module according to an exemplary embodiment of the present invention.
Figure 4:
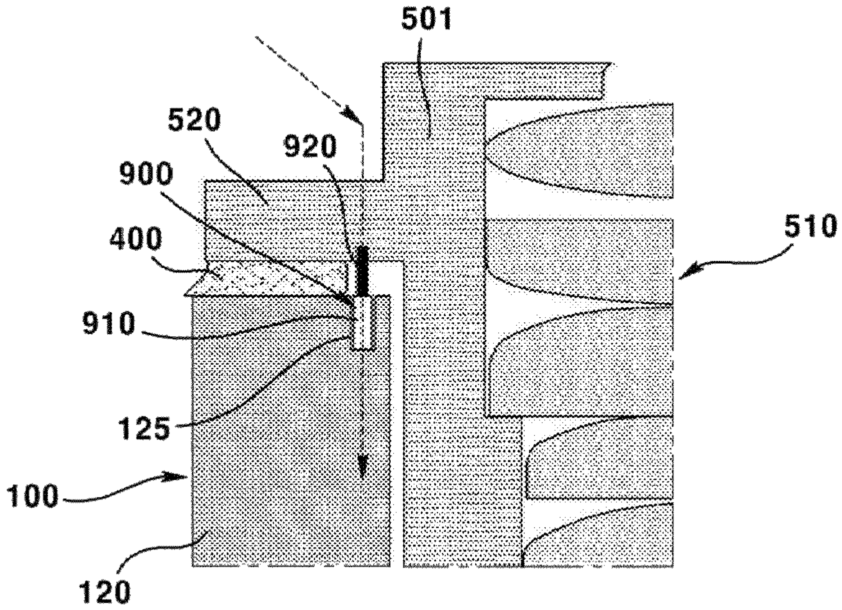
FIG. 4 is an enlarged view of A of FIG. 2.
Figure 5:
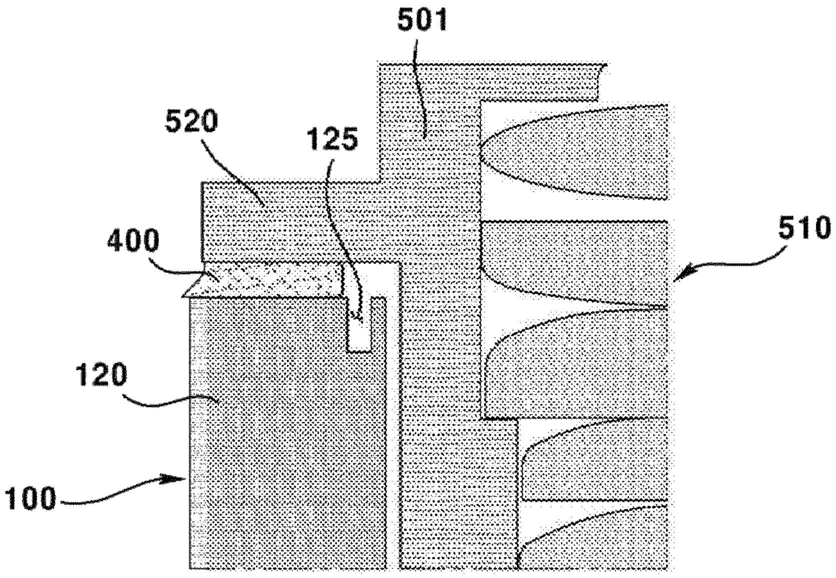
FIG. 5 is a drawing of FIG. 4 with the ground member omitted.

FIG. 1 is a perspective view illustrating the appearance of a camera module according to an exemplary embodiment of the present invention, FIG. 2 is a cross-sectional view of a camera module according to an exemplary embodiment of the present invention, FIG. 3 is an exploded perspective view of a camera module according to an exemplary embodiment of the present invention, FIG. 4 is an enlarged view of A of FIG. 2, and FIG. 5 is a drawing of FIG. 4 with the ground member omitted.

Referring to FIGS. 1 to 5, the camera module (10) according to an exemplary embodiment of the present invention may be a vehicle camera module. The camera module (10) may be coupled to a vehicle. The camera module (10) may be used in one or more of a front camera, a side camera, a rear camera, and a black box of the vehicle. The camera module (10) may be disposed at the front of the vehicle. The camera module (10) may be disposed at the rear of the vehicle. The camera module (10) may be coupled to a windscreen of the vehicle. The camera module (10) may be coupled to the windscreen of the front or rear of the vehicle. The camera module (10) may be disposed on the side of a vehicle. The camera module (10) may photograph a subject and output an image to a display (not shown).

The camera module (10) may include a first body (100). The first body (100) may be referred to as a front body, an upper housing, or a first housing. The first body (100) may include a body portion (110). The first body (100) may include a barrel portion (120). The first body (100) may be coupled to a lens module (500). The body portion (110), barrel portion (120), and lens module (500) of the first body (100) may be integrally formed. Any two or more of the body portion (110), barrel portion (120), and lens module (500) of the first body (100) may be integrally formed. In a modification, the body portion (110), the barrel portion (120), and the lens module (500) may each be formed separately.

The body portion (110) may be coupled to the barrel portion (120). The body portion (110) may be integrally formed with the barrel portion (120). The body portion (110) may be formed of a metal material. The body portion (110) may be disposed over a second body (200), which will be described later. The body portion (110) may be coupled to the second body (200). A bottom end of the body portion (110) may be secured to the second body (200). The body portion (110) may be coupled to the second body (200) by an adhesive. The body portion (110) may be coupled to a substrate (300), which will be described later.

The body portion (110) may be formed as a rectangular shape with an opening at the bottom. In this case, the corners of the body portion (110) may be rounded. The body portion (110) may include a top plate (111) and a first side plate (112) extending from the top plate (111). The top plate (111) may be formed in a rectangular shape. The top plate (111) may extend outwardly from a lower outer peripheral surface of the barrel portion (120). A first side plate (112) may extend downwardly from an outer edge of the top plate (111). The first side plate (112) may comprise a plurality of plates. The first side plate (112) may comprise four side plates. The first side plate (112) may be formed in the shape of a square plate. The first side plate (112) may include a first-1 side plate and a first-2 side plate, a first-3 side plate disposed opposite the first-1 side plate, and a first-4 side plate disposed opposite the first-2 side plate. The first side plate (112) may include first and fourth corners disposed among the first-1 through the first-4 side plates, respectively. Each of the first to fourth corners may include a rounded shape in at least a portion.

On an inner side of the body portion 110, a space portion may be formed that is compartmentalized from other regions. The space portion may be open at the bottom and covered at the top by the barrel portion (120) and the bottom surface of the lens module (500).

The body portion (110) may include a first edge region (170). The first edge region (170) may be disposed on an outer side of the space portion. The first edge region (170) may form a bottom surface of the body portion (110).

The first edge region (170) may include a first protrusion (172), a second protrusion (174), and a first groove (176). Relative to the center of the body portion (110), a second protrusion (174) may be disposed on an inner side of the first protrusion (172), and a first groove (176) may be disposed between the first protrusion (172) and the second protrusion (174). Here, the first groove (176) may be a space formed between the first protrusion (172) and the second protrusion (174).

The first protrusion (172) may be formed to project downwardly from a bottom surface of the body portion (110) than other areas. A lower end of the first protrusion (172) may project downwardly from an upper surface of the substrate (300). A lower end of the first protrusion (172) may project downwardly from a lower end of the second protrusion (174).

The second protrusion (174) may be disposed on an inner side of the first protrusion (172). A lower surface of the second protrusion (174) may be defined by a lower surface of the first body (100). A lower surface of the second protrusion (174) may contact an upper surface of the substrate (300). In other words, a lower surface of the first body (100), i.e., the body portion (110), may contact the upper surface of the substrate (300). The lower end of the second protrusion (174) may be disposed above the lower end of the first protrusion 172.

The area of the upper surface of the substrate (300) that is in contact with the lower surface of the second protrusion (174) may be a ground area with an exposed metal layer. Thus, a ground structure between the first body (100) and the substrate (300) may be implemented by contacting the second protrusion (174) with the substrate (300).

A first groove (176) may be disposed between the first protrusion (172) and the second protrusion (174). The first groove (176) may be defined as an inner space disposed between the first protrusion (172) and the second protrusion (174). The first groove (176) may be formed to be recessed upwardly from a lower end of the first protrusion (172) and a lower end of the second protrusion (174). A bottom surface of the first groove (176) may be disposed above the lower end of the first protrusion (172) and the lower end of the second protrusion (174). The bottom surface of the first groove (176) may be disposed above an upper surface of the substrate (300). Although it will be explained again, an adhesive (800) may be disposed in the first groove (176), and the adhesive (800) may be secured in contact with a side of the substrate (300) and a side portion of the first protrusion (172) and a side portion of the second protrusion (174).

The first body (100) may include a barrel portion (120). The barrel portion (120) may be a lens barrel. The barrel portion (120) may be formed of a metal material. The barrel portion (120) may be disposed on the body portion (110). The barrel portion (120) may extend from an upper surface of the body portion (110). The barrel portion (120) may be integrally formed with the body portion (110). In a modification, the barrel portion (120) may be coupled to the body portion (110). In this case, the barrel portion (120) may be secured to the body portion (110) by an adhesive. The barrel portion (120) may accommodate the lens module (500) therein. The barrel portion (120) may include a hole (122). A lens module (500) may be disposed in the hole (122) of the barrel portion (120). The inner circumferential surface of the hole in the barrel portion (120) may be formed in a shape and size that corresponds to the outer circumferential shape of the lens module (500).

The camera module (10) may include a lens module (500). The lens module (500) may be disposed in the barrel portion (120). The lens module (500) may be coupled to the barrel portion (120). The lens module (500) may be disposed in a hole (122) of the barrel portion (120). The lens module (500) may include a plurality of lenses (510). The plurality of lenses (510) may be housed within a barrel (501). The lens module (500) may be aligned with an image sensor, as described later. The lens module (500) may be optically aligned with the image sensor. The optical axis of the lens module (500) may coincide with the optical axis of the image sensor. The first body (100) may include an infrared ray filter (IR filter) disposed between the lens module (500) and the image sensor.

The lens module (500) may include a cylindrically shaped barrel (501) having the hole (122). The lens module (500) may include a flange portion (520) projecting outwardly from an outer surface of the barrel (501). When the lens module (500) is coupled to the first body (100), the flange portion (520) may be disposed on an upper surface of the barrel portion (120). To inhibit foreign matters from entering the space within the first body (100), a sealing member (400) may be disposed between the lower surface of the flange portion (520) and the upper surface of the barrel portion (120). The sealing member (400) may be an epoxy cured area. The coupling structure of the lens module (500) and the first body (100) will be described later.

The camera module (10) may include a second body (200). The second body (200) may be referred to as a rear body, a lower housing, or a second housing. The second body (200) may be formed in a rectangular shape with an open top. The second body (200) may be formed of a metal material. The second body (200) may be disposed below the first body (100). The second body (200) may be coupled to the first body (100). The second body (200) may be coupled with the first body (100) to form an inner space. The second body (200) may include a space portion (202) having a top opening. The second body (200) may include a bottom plate (207).

The bottom plate (207) may oppose a top plate (111) of the body portion (110) of the first body (100). The bottom plate (207) may be spaced apart from the top plate (111) of the body portion (110) of the first body (100) in an optical axis direction. The bottom plate (207) may be parallel to the top plate (111) of the body portion (110) of the first body (100). The bottom plate (207) may be formed in a rectangular shape. In this case, the corners of the bottom plate (207) may include a rounded shape at least in part.

The second body (200) may include a second side plate (208). The second side plate (208) may extend from the bottom plate (207). The second side plate (208) may extend from an outer edge of the bottom plate (207). A shield can (not shown) may be disposed on an inner surface of the second side plate (208). An inner surface of the second side plate (208) may be surface-contacted by the shield can. The upper end of the second side plate (208) may be coupled to the first body (100). An outer surface of the second side plate (208) may be on the same planar surface with an outer surface of the first side plate (112) of the first body (100).

The second body (200) may include a connector ejection portion (290). The connector ejection portion (290) may be coupled to the bottom plate (207). The connector ejection portion (290) may be disposed in a hole (not shown) formed in the bottom plate (207). The connector ejection portion (290) may penetrate the hole in the bottom plate (207). The connector ejection portion (290) may have a connector (700) disposed therein. The connector ejection portion (290) may be formed of a metal material.

The second body (200) may include a second edge region (270). The second edge region (270) may be disposed on an outer side of the space portion (202). The second edge region (270) may be formed on an upper surface of the second side plate (208). The second edge region (270) may form a top edge of the second body (200). The second edge region (270) may be disposed to face a first edge region (170) in an optical axis direction.

When the first body (100) and the second body (200) are joined, the first edge region (170) and the second edge region (270) may be disposed at least partially spaced apart in the optical axis direction. When the first body (100) and the second body (200) are joined, an adhesive receptacle may be formed between the first edge region (170) and the second edge region (270) in which an adhesive (800), which will be described later, is received.

The second edge region (270) may include, relative to the third protrusion (272), a second groove (274) disposed on an outer side of the third protrusion (272) and a third groove (276) disposed on an inner side of the third protrusion (272). With respect to the optical axis direction, the first protrusion (172) and the second groove (274) may be oppositely disposed, the second protrusion (174) and the third groove (276) may be oppositely disposed, and the first groove (176) may be disposed opposite the third protrusion (272). The third protrusion (272) may be formed to project upwardly from an upper surface of the second body (200). The third protrusion (272) may be formed to project upwardly from an upper surface of the second side plate (208). The third protrusion (272) may be disposed at least partially on the inner side of the first groove (176). With respect to a direction perpendicular to the optical axis direction, the third protrusion (272) may be disposed to at least partially overlap the first protrusion (172) or the second protrusion (174). An upper end of the third protrusion (272) may be disposed above a bottom surface of the second groove (274) or a bottom surface of the third groove (276).

The second groove (274) may be disposed on an outer side of the third protrusion (272). A bottom surface of the second groove (274) may be disposed lower than an upper surface of the third protrusion (272). The bottom surface of the second groove (274) may be disposed above the bottom surface of the third groove (276). The second groove (274) may be coupled to the first protrusion (172). The bottom surface of the second groove (274) may contact a lower surface of the first protrusion (172), but alternatively, the bottom surface of the second groove (274) and the lower surface of the first protrusion (172) may be spaced apart in an optical axis direction. In the spaced-apart space, an adhesive (800) may be placed, as will be described later. A third groove (276) may be disposed on the inner side of the third protrusion (272). A lower surface of the third groove (276) may be disposed lower than an upper surface of the third protrusion (272) and a lower surface of the second groove (274). The third groove (276) may be defined by an upper surface of the second body (200). A bottom surface of the third groove (276) may contact a lower surface of the substrate (300). In other words, the upper surface of the second body (200) may contact the lower surface of the substrate (300). In other words, the upper surface of the second side plate (208) may contact the lower surface of the substrate (300). Accordingly, an upper surface of the substrate (300) may contact a lower surface of the first body (100), and a lower surface of the substrate (300) may contact an upper surface of the second body (200).

The lower surface of the substrate (300) that is in contact with the bottom surface of the third groove (276) may be a ground region with an exposed metal layer. Accordingly, a ground structure between the substrate (300) and the second body (200) may be implemented. An adhesive (800) may be disposed between the first edge region (170) and the second edge region (270). The adhesive (800) may mutually bond between the first edge region (170) and the second edge region (270). The adhesive (800) may be a cured epoxy. The adhesive (800) may be disposed in at least one of the following areas: between the first protrusion (172) and the second groove (274), between the first groove (176) and the third protrusion (272), between the second protrusion (174) and the third groove (276), and on a side of the substrate (300), to mutually bond the first body (100) and the second body (200).

The camera module (10) may include a substrate (300). The substrate (300) may be a printed circuit board. The substrate (300) may be disposed between the first body (100) and the second body (200). The substrate (300) may be disposed to overlap the first edge region (170) or the second edge region (270) in a direction perpendicular to the optical axis direction.

An image sensor (not shown) may be disposed on an upper surface of the substrate (300). A connector (700) may be coupled to a lower surface of the substrate (300). The substrate (300) may be electrically connected to the connector (700).

Hereinafter, the coupling structure of the first body (100) and the lens module (500) will be described.

As described above, the lens module (500) may include a barrel (501) that receives a lens (510) therein. Furthermore, the barrel (501) may include a flange portion (520) that protrudes more outwardly from an outer surface and is coupled to an upper surface of the barrel portion (120) by its lower surface. The flange portion (520) may have a ring-shaped cross-sectional shape. As shown in FIG. 4, a side of the flange portion (520) may be disposed more inwardly from a side of the barrel portion (120).

The sealing member (400) may be disposed between the lower surface of the flange portion (520) and the upper surface of the barrel portion (120), and may interconnect the lens module (500) and the first body (100). The sealing member (400) may be a cured area of epoxy. An outer surface of the sealing member (400) may be beveled to connect a side of the flange portion (520) with a side of the barrel portion (120). Based on a direction perpendicular to the optical axis direction, the inner surface of the sealing member (400) may be disposed outwardly from the inner surface of the barrel portion (120) in the hole (122) formation region. The first body (100) and barrel (501) according to the exemplary embodiment may be formed of a metal material. At least some of the surfaces of the first body (100) and the barrel (501) may be formed with coating treatment areas, such as anodizing. Furthermore, the lower surface of the flange portion (520) and the upper surface of the barrel portion (120) may be uncoated. The lower surface of the flange portion (520) and the upper surface of the barrel portion (120) may be areas where metal region is exposed to the outside, such as through laser processing.

The camera module (10) may include a ground member (900). The ground member (900) may electrically connect the lens module (500) and the first body (100). The ground member (900) may electrically connect the barrel portion (120) and the flange portion (520). The ground member (900) may be formed of a metal material. The ground member (900) may be coupled at one end to the lower surface of the flange portion (520) and at the other end to the upper surface of the barrel portion (120). The ground member (900) may include a pogo-pin. The ground member (900) may include a body (910), and a pin (920) resiliently movably coupled to the body (910) in the optical axis direction. A resilient member, such as a spring, may be disposed within the body (910) to provide resilient force to the pin (920). Thus, the flange portion (520) and the barrel portion (120) may be electrically connected at all times by the ground member (900) providing the resilient force, regardless of any clearance or coupling tolerances imposed by the sealing member (400) upon contact of the flange portion (520) and the barrel portion (120).

The upper surface of the barrel portion (120) may be formed with a groove (125) to be more recessed than other areas, into which the body (910) is engaged. The cross-sectional shape of the groove (125) may be formed to correspond to the cross-sectional shape of the body (910). An optical axis length of the groove (125) may correspond to an optical axis length of the body (910). The pin (920) may have at one end coupled to the body (910) and at the other end coupled to the lower surface of the flange portion (520). A groove (not shown) more recessed than the other region may also be formed on the lower surface of the flange portion (520) where the end of the pin (920) is engaged.

As described above, the upper surface of the barrel portion (120) that engages the body (910) and the pin (920) and the lower surface of the flange portion (520) may be areas where a metal layer is exposed, and the first body (100) and the lens module (500) may be electrically connected to each other via the ground member (900). That is, the first body (100) and the lens module (500) may each form a ground region. Accordingly, electromagnetic waves generated from the outside may be radiated to the outside through the first body (100) and the second body (200) without entering the components within the camera module (10), including the lens (510), thereby further improving the electrical characteristics of the camera module and inhibiting the inclusion of noise in the electrical signals, which may result in superior quality images.

Furthermore, since the lens module (500) is elastically supported on the first body (100) through the movable pin (920) via the elastic portion, it has the advantage of being easy to adjust the distance between the lens (510) and the image sensor (310).

On the other hand, while the present embodiment illustrates that the ground member (900) is a pogo pin, it is not limited thereto, and the ground member (900) may be a spring whose upper and lower ends contact the lower surface of the flange portion (520) and the upper surface of the barrel portion (120), respectively, which may also be understood to be included in the technical idea of the present invention.

While the exemplary embodiments of the present invention have been described above with reference to the accompanying drawings, it will be understood by one having ordinary skill in the art to which the invention belongs that the invention may be practiced in other specific forms without altering its technical ideas or essential features. It should therefore be understood that the embodiments described above are exemplary in all respects and not limiting.

The invention claimed is:

1. A camera module comprising:

a first body including a barrel portion having a hole formed therein;

a lens module disposed at least partially in the hole, and including a barrel having a lens disposed therein and a flange portion protruding from an outer surface of the barrel to be disposed on the barrel portion; and a ground member having both ends coupled to the barrel portion and the flange portion, respectively, wherein the ground member includes a pogo pin, wherein the pogo pin includes a body coupled to the barrel portion and a pin elastically coupled to the body and coupled to the flange portion, and wherein the pin applies an elastic force in an optical axis direction of the lens with respect to the body.

2. The camera module of claim 1, wherein a groove into which the ground member is coupled is disposed on an upper surface of the barrel portion or a lower surface of the flange portion.

3. The camera module of claim 1, wherein a sealing member is disposed between the barrel portion and the flange portion, and the barrel portion and the flange portion are spaced apart in an optical axis direction.

4. The camera module of claim 1, wherein the first body and the lens module are made of metal, and at least some of the surfaces of the first body and the lens module have a coating region.

5. The camera module of claim 4, wherein the surface of the barrel portion and the flange portion to which the ground member is coupled are a region other than the coating region, and a metal layer is exposed therefrom.

6. The camera module of claim 3, wherein a side of the flange portion is disposed more inwardly than a side of the barrel portion, and the ground member is disposed more inwardly than the sealing member.

7. A camera module comprising:

a first body including a barrel portion having a hole formed therein;

a lens module disposed at least partially in the hole, and including a barrel having a lens disposed therein and a flange portion protruding from an outer surface of the barrel to be disposed on the barrel portion; and a pogo pin having both ends coupled to the barrel portion and the flange portion, respectively, wherein the pogo pin includes a body coupled to the barrel portion, and a pin elastically coupled to the body and coupled to the flange portion, and wherein the pin applies an elastic force in an optical axis direction of the lens with respect to the body.

8. The camera module of claim 3, wherein the sealing member is epoxy.

9. The camera module of claim 6, wherein an outer surface of the sealing member is inclined to connect a side surface of the flange portion and a side surface of the barrel portion.

10. The camera module of claim 1, wherein a groove into which the body is coupled is formed on an upper surface of the barrel portion, and wherein, based on an optical axis direction, a length of the groove is equal to a length of the body.

11. The camera module of claim 1, wherein the first body and the lens module are each ground areas.

12. The camera module of claim 3, wherein an inner surface of the sealing member is disposed outside an inner surface of the barrel portion.

13. The camera module of claim 3, comprising:

a second body coupled to a rear of the first body; and a substrate disposed between the first body and the second body.

14. The camera module of claim 7, wherein a sealing member is disposed between the barrel portion and the flange portion, and the barrel portion and the flange portion are spaced apart in an optical axis direction.

15. The camera module of claim 14, wherein a side of the flange portion is disposed more inwardly than a side of the barrel portion, and the pogo pin is disposed more inwardly than the sealing member.

16. The camera module of claim 7, wherein the first body and the lens module are each ground areas.

* * * * *